United States Patent
Brück et al.

(10) Patent No.: US 6,630,258 B1
(45) Date of Patent: Oct. 7, 2003

(54) PROCESS FOR WETTING AT LEAST ONE OF THE SURFACES OF AN ELECTROLYTE IN A FUEL CELL

(75) Inventors: Rolf Brück, Bergisch Gladbach (DE); Andree Bergmann, Lohmar (DE); Jörg-Roman Konieczny, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 141 days.

(21) Appl. No.: 09/702,025

(22) Filed: Oct. 30, 2000

Related U.S. Application Data

(63) Continuation of application No. PCT/EP99/02923, filed on Apr. 29, 1999.

(30) Foreign Application Priority Data

Apr. 30, 1998 (DE) .......................... 198 19 324

(51) Int. Cl.$^7$ .......................... H01M 8/04; H01M 8/02; H01M 8/10
(52) U.S. Cl. .............................. 429/13; 429/24; 429/26; 429/30; 429/34; 429/39; 429/40
(58) Field of Search .............................. 429/13, 22, 24, 429/26, 30, 34, 38, 39, 40

(56) References Cited

U.S. PATENT DOCUMENTS

| | | | | |
|---|---|---|---|---|
| 3,923,546 A | * | 12/1975 | Katz et al. | ...................... 429/13 |
| 5,108,849 A | * | 4/1992 | Watkins et al. | ................ 429/30 |
| 5,344,721 A | | 9/1994 | Sonai et al. | |
| 6,087,028 A | * | 7/2000 | Goto | ........................... 429/24 |
| 6,207,312 B1 | * | 3/2001 | Wynne et al. | ................. 429/13 |

FOREIGN PATENT DOCUMENTS

| | | | |
|---|---|---|---|
| EP | 0 499 593 A1 | | 8/1992 |
| JP | 63-105473 | * | 5/1988 |
| JP | 03 102 774 | | 4/1991 |
| JP | 04 012 465 | | 1/1992 |
| JP | 04 095 356 | | 3/1992 |
| JP | 04 095 357 | | 3/1992 |
| JP | 06 084 533 | | 3/1994 |
| JP | 6-231793 | * | 8/1994 |
| JP | 6-260190 | * | 9/1994 |
| JP | 06 275 284 | | 9/1994 |
| JP | 06 325 780 | | 11/1994 |
| JP | 06 338 338 | | 12/1994 |
| JP | 07 240 221 | | 9/1995 |
| JP | 08 287 934 | | 11/1996 |
| JP | 08 306 375 | | 11/1996 |

OTHER PUBLICATIONS

D. Staschewski: "Internal Humidifying Of PEM Fuel Cells", *International Journal of Hydrogen Energy*, vol. 21, May 1996, No. 5, pp. 381–385, XP–000582764.

* cited by examiner

*Primary Examiner*—Randy Gulakowski
*Assistant Examiner*—Jonathan Crepean
(74) *Attorney, Agent, or Firm*—Laurence A. Greenberg; Werner H. Stemer; Gregory L. Mayback

(57) ABSTRACT

A low-temperature fuel cell having two porous electrodes is described. An electrolyte having a surface on a fuel gas side and a surface on a reaction gas side is disposed between the electrodes. A method for wetting at least one of the surfaces of the electrolyte in such a fuel cell is also described. To this end the fuel cell is positioned adjacent to at least one channel element containing a semi-permeable membrane through which a fluid guided in the channel element is able to pass towards the electrolyte and at least partly covers at least one of the surfaces of the electrolyte with a layer of water so that the reactions taking place at the electrolyte are enhanced. The invention is advantageous insofar as dosing can be carried out via an adjustment of the pressure or via the concentration of water in the fluid, in particular if the fluid also contains a carrier medium.

23 Claims, 3 Drawing Sheets

US 6,630,258 B1

PROCESS FOR WETTING AT LEAST ONE OF THE SURFACES OF AN ELECTROLYTE IN A FUEL CELL

CROSS-REFERENCE TO RELATED APPLICATION

This is a continuation of copending International Application PCT/EP99/02923, filed Apr. 29, 1999, which designated the United States.

BACKGROUND OF THE INVENTION

Field of the Invention

The invention relates to a process for wetting at least one surface of an electrolyte, which is in particular a proton-conducting electrolyte membrane, in a fuel cell, in particular a low-temperature fuel cell, and to a fuel cell.

As in other galvanic elements, in fuel cells the bond energy which is liberated, for example, during the chemical bonding of hydrogen ($H_2$) and oxygen ($O_2$) is converted into electrical energy and heat. There is a fundamental distinction drawn between low-temperature fuel cells (up to approx. 200° C.) and high-temperature fuel cells (approximately 600 to 1100° C.). Between these two classes are the so-called molten carbonate fuel cells (MCFC), which have a working temperature of approximately 200 to 600° C. and have a liquid electrolyte disposed in a matrix.

High-temperature fuel cells, such as solid oxide fuel cells (SOFC) contain, for example, a solid electrolyte made from zirconia which is ion-conducting at a working temperature of 850 to 1050° C. They are operated primarily in stationary installations and functioning as decentralized power supplies.

Low-temperature fuel cells in combination with an electric motor could form an alternative to conventional internal combustion engines, in particular in vehicles and railroad systems.

In known electric vehicles, the electrical energy is first generated in a power plant and then temporarily stored on board the vehicle in a battery. High costs, considerable weight, limited service life and long charging times for these batteries represent problems that have not been satisfactorily solved.

Therefore, concepts which do not require temporary storage, i.e. which generate power onboard and according to demand, therefore appear particularly promising; in particular, this is true of the concept of fuel cells which have a proton-conducting membrane electrolyte, known as a proton exchange membrane fuel cell (PEMFC). The gaseous fuel, in particular gaseous hydrogen and gaseous oxygen, does not have to be burnt, but rather is directly converted into electrical energy and steam in a so-called cold reaction. The electrolyte in the PEM fuel cell separates the two gases from one another and prevents a so-called hot reaction. An electrochemical process at the electrolyte only allows protons, i.e. positively charged hydrogen ions ($H^+$), to pass through. The electrons of the hydrogen atoms are separated out as the hydrogen passes through the electrolyte and are retained, while the hydrogen ions react with the oxygen particles on the other side. On account of the excess of electrons on the hydrogen side and the lack of electrons on the oxygen side of the electrolyte, there is a difference in potential across the adjacent electrodes, so that when the electrodes are electrically connected via an external circuit which includes a consumer, an electric current flows from the anode to the cathode. In addition to the electrical energy, heat and water are formed as reaction products.

In the case of the low-temperature fuel cells, in particular the PEM fuel cells, the surfaces of the electrolyte and/or the electrolyte-side surfaces of the adjacent electrodes need to be kept moist in order to promote the reaction and achieve high levels of efficiency. For this purpose, it is known, for example, from German Patent DE 43 18 818 C2 for the fuel cell to be operated with a humidified gas which, however, has to be compressed beforehand at a relatively high cost in order subsequently to be miscible with a fluid, in particular with water.

SUMMARY OF THE INVENTION

It is accordingly an object of the invention to provide a process for wetting at least one of the surfaces of an electrolyte in a fuel cell which overcomes the above-mentioned disadvantages of the prior art methods and devices of this general type.

With the foregoing and other objects in view there is provided, in accordance with the invention, a wetting process. The process includes the step of providing a fuel cell having an electrolyte with at least one surface and at least one channel body with at least one semi-permeable membrane disposed above the electrolyte. A fluid containing a wetting agent is guided in the channel body of the fuel cell, it being possible for at least some of the wetting agent to pass through the semi-permeable membrane of the channel body to reach the electrolyte. The amount of the fluid to be supplied to the electrolyte is metered in dependence on a type of the fuel cell used and on parameters that can be adapted to a particular fuel cell configuration.

The invention is based on the object of providing a process for wetting at least one of the surfaces of an electrolyte, by which it is possible to ensure that the electrolyte is adequately wetted. A further object of the invention is to provide a fuel cell in which the outlay on an apparatus for wetting at least one surface of the electrolyte is relatively low.

The process according to the invention for wetting at least one surface of an electrolyte, which is in particular a proton-conducting electrolyte membrane, in a fuel cell is distinguished by the fact that the fluid which contains the wetting agent is provided in at least one channel body. At least some of the wetting agent can pass through at least one semi-permeable membrane of the channel body to reach the electrolyte. This process results in a safe, reliable wetting of at least one surface of the electrolyte.

The wetting agent is preferably water.

At least one of the surfaces of the electrolyte is at least partially provided, by the wetting agent guided in the channel body, with a layer of water. Supplying water in this way advantageously enables at least one of the surfaces of the electrolyte to be permanently and continuously provided with a layer of water, the reactions taking place on the electrolyte, in particular the ionization of the hydrogen atoms, being promoted by the layer of water. Preferably, at least that surface of the electrolyte which is on the fuel gas side is wetted, since the demand for wetting agent, on account of water being a reaction product, is lower on the surface on the reaction gas side.

According to the invention, in addition to the wetting agent the fluid preferably contains at least one carrier medium, the carrier medium used preferably being air. A fluid of this type can then advantageously be fed to the electrolyte through the porous electrodes.

In accordance with an added feature of the invention, the electrolyte is a proton-conducting electrolyte membrane.

In accordance with an additional feature of the invention, the fuel cell is a low-temperature fuel cell.

In accordance with another feature of the invention, there is the step of using temperature as one of the parameters.

With the foregoing and other objects in view there is provided, in accordance with the invention, a low-temperature fuel cell. The fuel cell contains two porous electrodes of different polarities each having a gas-side surface and an electrolyte-side surface. An electrolyte is disposed between the electrodes on the electrolyte-side surface of each of the electrodes. The electrodes each have surfaces including a surface on a fuel gas side and a surface on a reaction gas side. At least one channel body is configured such that at least one of the surfaces of the electrolyte is at least partially wettable by a fluid guided in the channel body and contains a wetting agent. The channel body has at least one semi-permeable membrane through which the wetting agent can pass to reach the electrolyte, and an amount of the wetting agent which is to be supplied to the electrolyte can be metered in dependence on a type of the fuel cell used and on parameters which can be adapted to a particular fuel cell configuration.

In accordance with a further feature of the invention, the channel body is disposed at least partially in an approximately meandering form.

According to the invention, the channel body is preferably disposed at least partially on the gas-side surface of at least one electrode and/or integrated at least partially in at least one electrode. The channel body may be formed or disposed at least partially as a reservoir in the form of a blind hole. It is also possible to provide a plurality of channel bodies that run substantially parallel to one another. In addition, the channel bodies are disposed substantially parallel to the surfaces of the electrode. The various configurations advantageously allow a simple, in particular permanent and continuous, supply of a wetting agent to at least one surface of the electrolyte irrespective of the configuration of the fuel cells, for example above one another in so-called stacks or in strip form next to one another.

According to the invention, the channel body preferably has at least one semi-permeable membrane that is preferably disposed on the electrolyte side in the channel body. The wetting agent can advantageously pass through the semi-permeable membrane to reach the electrolyte.

In its most simple configuration, the channel body is at least partially a plastic molding. Depending on what is expedient, the channel body may, however, also be at least partially formed by the electrode itself, which is advantageous in particular in terms of manufacturing technology.

According to the invention, the fuel cell is preferably cooled by the fluid and/or the channel body. For this purpose, the channel body is at least partially configured as a heat sink, preferably in ribbed form. Alternatively, or in addition, the channel body is connected to a cooling device, which is preferably configured as a cooling circuit. The cooling of the fuel cells is important in particular in the case of fuel gases and/or oxidation gases that are supplied at high pressure.

Preferably, according to the invention, the amount of wetting agent which is to be supplied to the electrolyte can be metered as a function of the type of fuel cell used and in dependence on parameters which can be adapted to the particular fuel cell configuration, in particular as a function of temperature.

The advantages achieved with the invention relate in particular to the fact that metering is possible via an adjustment in the pressure or via the concentration of the wetting agent in the fluid, in particular if the fluid additionally contains a carrier medium.

Other features which are considered as characteristic for the invention are set forth in the appended claims.

Although the invention is illustrated and described herein as embodied in a process for wetting at least one of the surfaces of an electrolyte in a fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
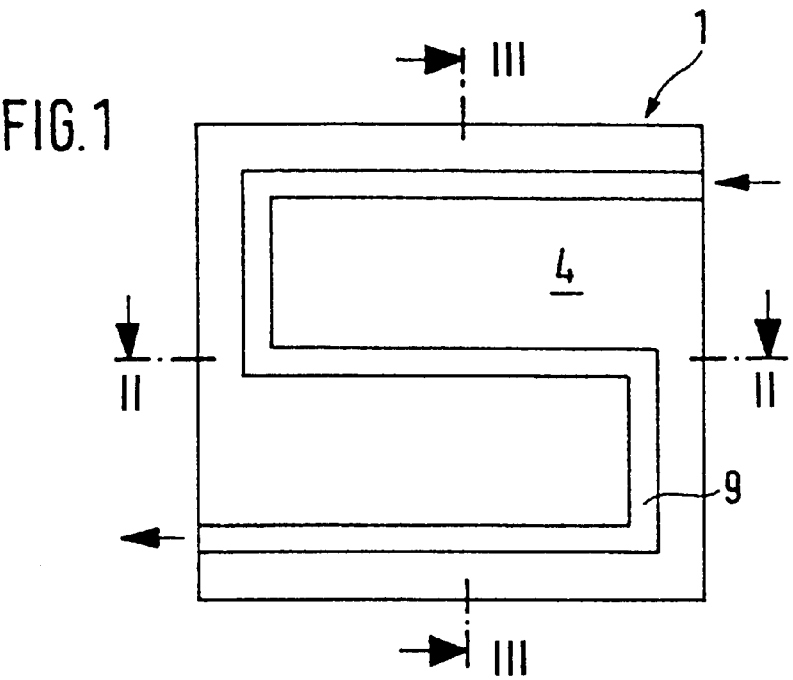
FIG. 1 is a diagrammatic, plan view of a low-temperature fuel cell having a channel body disposed in meandering form on a gas-side surface of an electrode according to the invention.

In all the figures of the drawing, sub-features and integral parts that correspond to one another bear the same reference symbol in each case. Referring now to the figures of the drawing in detail and first, particularly, to FIG. 1 thereof, there is shown a plan view of a low-temperature fuel cell 1 with a channel body 9 which is disposed in a meandering form on a gas-side surface 4 of an electrode 2.

In FIGS. 1, 5, 7, 9, bold, black arrows characterize the direction of flow of a fluid which is guided in the channel body 9.

Figure 2:
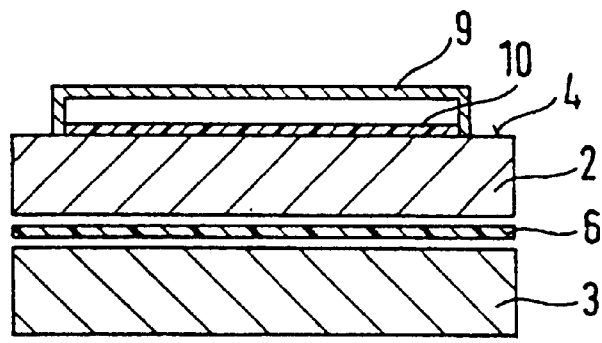
FIG. 2 is a sectional view of the low-temperature fuel cell shown in FIG. 1 taken along the line II—II.
Figure 3:
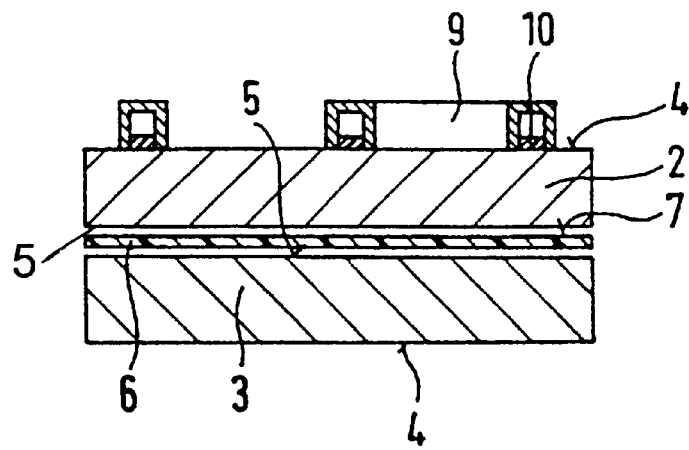
FIG. 3 is a sectional view of the low-temperature fuel cell shown in FIG. 1, taken along the line III—III.

FIGS. 2 and 3 show sectional views of the low-temperature fuel cell 1 shown in FIG. 1, taken along the line II—II and line III—III, respectively. An electrolyte 6, which is in particular a proton-conducting polymer film that is only a few tenths of a millimeter thick, is disposed between the electrodes 2 and 3 on an electrolyte-side surface 5 of the electrodes 2, 3. On the gas-side surface 4 of the electrode 2 is disposed the channel body 9 having the meandering form. The channel body 9 has a semi-permeable membrane 10 on an electrolyte side, through which membrane the fluid, preferably only a wetting agent contained in the fluid, can pass to reach the electrolyte 6.

Figure 4:
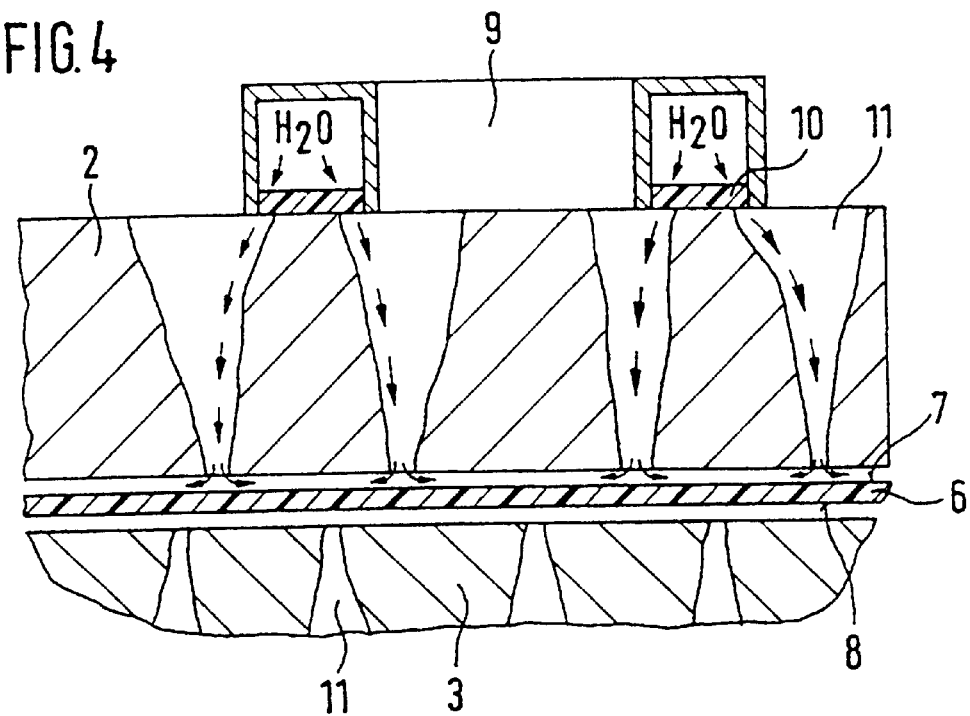
FIG. 4 is a partial, enlarged, sectional view of an excerpt from the low-temperature fuel cell shown in FIG. 3.

FIG. 4 shows an enlarged excerpt of the low-temperature fuel cell 1 shown in FIG. 3. The wetting agent, preferably water, as indicated by the small arrows, initially passes through the semi-permeable membrane 10 and then through pores 11 in the porous electrode 2 to reach the electrolyte 6, and provides that surface 7 of the electrolyte 6 which is on the fuel gas side with a wetting, in particular with a layer of water. The other side of the electrolyte 6 being a reaction gas side 8.

Figure 5:
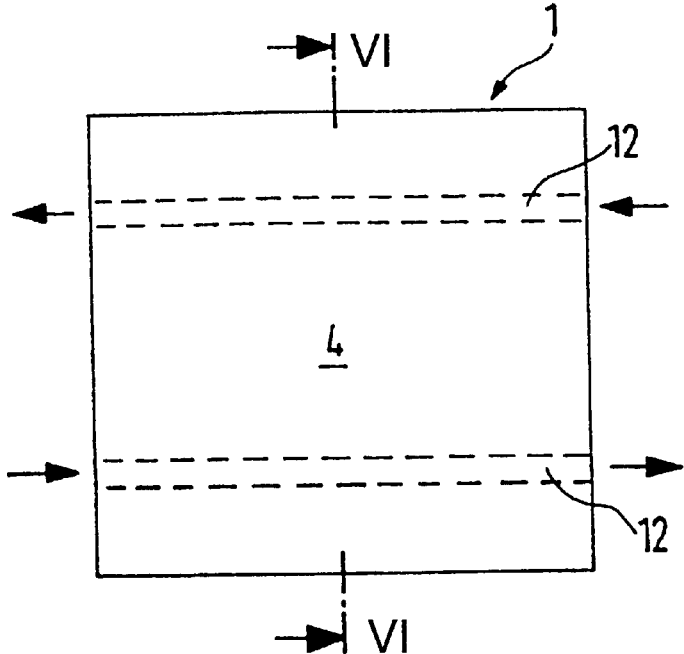
FIG. 5 is a plan view of the low-temperature fuel cell with channel bodies that are integrated in the electrode and run substantially parallel.

FIG. 5 shows a plan view of the low-temperature fuel cell 1 with two channels 12 that are integrated in the electrode 2 and run substantially parallel. The fluid flows through the channels 12 that are integrated in the electrode 2 in opposite directions of flow if the channels 12 are connected to one another (not shown) and therefore serve in one case as an incoming channel and in one case a return channel.

Figure 6:
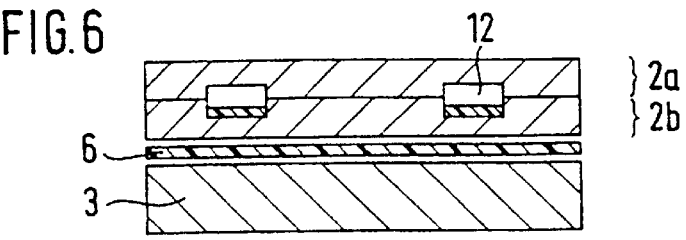
FIG. 6 is a sectional view of the low-temperature fuel cell shown in FIG. 5, taken along the line VI—VI.

FIG. 6 shows a side view of the low-temperature fuel cell 1 shown in FIG. 5, taken along the line VI—VI. The electrode 2 is composed of two layers, a gas-side layer 2a and an electrolyte-side layer 2b. Grooves are formed in each of the layers 2a, 2b in such a way that when the layers 2a, 2b are disposed on top of one another, the walls of the groove delimit the channel 12. A two-layer system of this type is advantageous in particular in terms of manufacturing technology.

Figure 7:
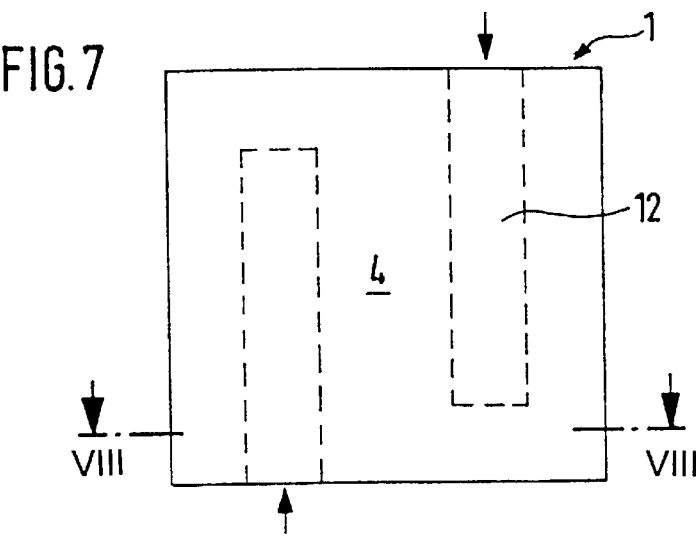
FIG. 7 is a plan view of the low-temperature fuel cell with channel bodies that are integrated in the electrode and are configured as a reservoir in the form of a blind hole.

FIG. 7 shows a plan view of the low-temperature fuel cell 1 having the channel 12 which is integrated in the electrode 2 and is configured as a reservoir in the form of a blind hole. The fluid is fed to the reservoir from the side (not shown), in such a way that it is in continuous contact with the semi-permeable membrane 10 disposed in the channel 12 and can pass through this membrane direct to the electrolyte 6, as also illustrated in FIG. 8, and provides in particular that surface 7 of the electrolyte 6 which is on the fuel gas side with a permanent layer of water.

Figure 8:
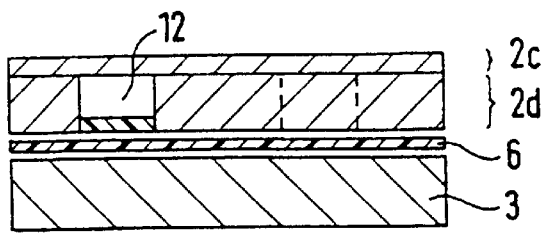
FIG. 8 is a sectional view of the low-temperature fuel cell shown in FIG. 7, taken along the line VIII—VIII.

FIG. 8 shows a side view of the low-temperature fuel cell 1 shown in FIG. 7, taken along line VIII—VIII. The electrode 2, in a similar way to the electrode 2 in FIG. 6, is composed of two layers 2c and 2d, namely a continuous upper conducting and contact layer 2c and a lower layer 2d in which the channels 12, which are configured as reservoirs in the form of blind holes, are integrated.

Figure 9:
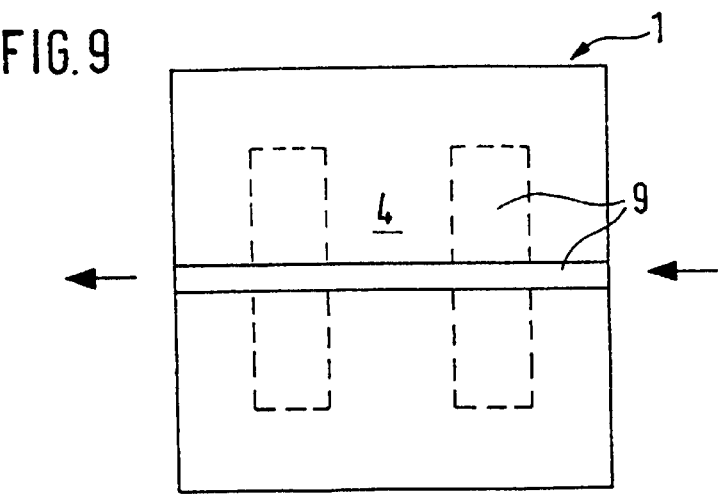
FIG. 9 is a plan view of another embodiment of the low-temperature fuel cell with channel bodies which are integrated in the electrode and are configured as a reservoir in the form of a blind hole.

FIG. 9 is a plan view of a further embodiment of the low-temperature fuel cell 1 with the channel bodies 9 which are integrated in the electrode 2 and are configured as reservoirs in the form of blind holes. In this case, the fluid is fed to the reservoir via the channel body 9 disposed on the gas-side surface 4 of the electrode 2.

We claim:

1. A wetting process, which comprises the steps of:
   providing a fuel cell having electrodes with a gas-side surface, an electrolyte with at least one surface, and at least one channel body with at least one semi-permeable membrane disposed above the electrolyte, the channel body directly contacting the gas-side surface of at least one of the electrodes;
   providing a fluid containing a wetting agent in the channel body of the fuel cell, it being possible for at least some of the wetting agent to pass through the semi-permeable membrane of the channel body to reach the electrolyte;
   providing the fluid with air as a carrier medium and carrying the wetting agent in the carrier medium; and
   metering an amount of the fluid to be supplied to the electrolyte in dependence on a type of the fuel cell used and on parameters which can be adapted to a particular fuel cell configuration.

2. The process according to claim 1, which comprises using water as the wetting agent.

3. The process according to claim 1, which comprises wetting at least the surface of the electrolyte which is on a fuel gas side.

4. The process according to claim 1, wherein the electrolyte is a proton-conducting electrolyte membrane.

5. The process according to claim 1, wherein the fuel cell is a low-temperature fuel cell.

6. The process according to claim 1, which comprises using temperature as one of the parameters.

7. A low-temperature fuel cell, comprising:
   two porous electrodes of different polarities each having a gas-side surface and an electrolyte-side surface;
   an electrolyte disposed between said electrodes on said electrolyte-side surface of each of said electrodes and having surfaces including a surface on a fuel gas side and a surface on a reaction gas side; and
   at least one channel body configured for at least partially wetting at least one of said surfaces of said electrolyte by a fluid guided in said channel body and containing a wetting agent, said fluid containing air as at least one carrier medium for carrying the wetting agent, said channel body being in direct contact with said gas-side surface of at least one of said electrodes, said channel body having at least one semi-permeable membrane through which the wetting agent can pass to reach said electrolyte, and in that an amount of the wetting agent which is to be supplied to said electrolyte can be metered in dependence on a type of the fuel cell used and on parameters which can be adapted to a particular fuel cell configuration.

8. The fuel cell according to claim 7, wherein one of said parameters is temperature.

9. The fuel cell according to claim 7, wherein the wetting agent is water.

10. The fuel cell according to claim 7, wherein said channel body is disposed at least partially on said gas-side surface of at least one of said electrodes.

11. The fuel cell according to claim 7, wherein said channel body is at least partially integrated in at least one of said electrodes.

12. The fuel cell according to claim 10, wherein said channel body is formed at least partially as a reservoir in a form of a blind hole.

13. The fuel cell according to claim 10, wherein said channel body is disposed at least partially in an approximately meandering form.

14. The fuel cell according to claim 10, wherein said channel body is one of a plurality of channel bodies disposed substantially parallel to one another.

15. The fuel cell according to claim 10, where said channel body is disposed substantially parallel to said gas-side surface.

16. The fuel cell according to claim 7, wherein channel body has an electrolyte side and said semi-permeable membrane is disposed on said electrolyte side in said channel body.

17. The fuel cell according to claim 7, wherein said channel body is at least partially a plastic molding.

18. The fuel cell according to claim 7, wherein said channel body is at least partially formed by one of said electrodes.

19. The fuel cell according to claim 7, wherein said channel body is a heat sink.

20. The fuel cell according to claim 19, wherein said heat sink is a ribbed heat sink.

21. The fuel cell according to claim 7, including a cooling device connected to said channel body.

22. The fuel cell according to claim 21, wherein said cooling device is a cooling circuit.

23. The fuel cell according to claim 7, wherein said electrolyte is a proton-conducting polymer film.

* * * * *